United States Patent
Bachert et al.

(10) Patent No.: US 12,503,987 B2
(45) Date of Patent: Dec. 23, 2025

(54) CYLINDER HEAD FOR AN INTERNAL COMBUSTION ENGINE WITH AN EXHAUST AFTERTREATMENT ARRANGEMENT AND AN INTERNAL COMBUSTION ENGINE WITH SUCH A CYLINDER HEAD

(71) Applicants: DEUTZ Aktiengesellschaft, Cologne (DE); Deere & Company, Moline, IL (US)

(72) Inventors: Mario Bachert, Leverkusen (DE); Lutz Ihlenfeldt, Gummersbach (DE); Marco John, Kerpen (DE); Jörn Ohmann, Essen (DE)

(73) Assignees: Deutz Aktiengesellschaft, Cologne (DE); Deere & Company, Moline, IL (US)

( * ) Notice: Subject to any disclaimer, the term of this patent is extended or adjusted under 35 U.S.C. 154(b) by 59 days.

(21) Appl. No.: 18/661,801

(22) Filed: May 13, 2024

(65) Prior Publication Data

US 2024/0376848 A1    Nov. 14, 2024

(30) Foreign Application Priority Data

May 13, 2023 (DE) .......................... 102023001954.2

(51) Int. Cl.
*F01N 13/18* (2010.01)
*F01N 13/10* (2010.01)
*F02F 1/24* (2006.01)

(52) U.S. Cl.
CPC ................ *F02F 1/24* (2013.01); *F01N 13/10* (2013.01)

(58) Field of Classification Search
CPC ...... F01N 13/10; F01N 13/08; F01N 2450/24; F02F 1/24
See application file for complete search history.

(56) References Cited

U.S. PATENT DOCUMENTS

| | | | |
|---|---|---|---|
| 10,837,334 B2 * | 11/2020 | Matsui | ............. F02M 35/10222 |
| 2010/0186394 A1 | 7/2010 | Harrison et al. | |
| 2015/0306950 A1 * | 10/2015 | Sandou | .................... F01N 3/021 |
| | | | 60/297 |
| 2017/0009628 A1 * | 1/2017 | Kimura | .................... F01N 3/103 |
| 2017/0204770 A1 | 7/2017 | Kimura et al. | |
| 2020/0102916 A1 * | 4/2020 | Suzuki | ...................... F02F 1/36 |

FOREIGN PATENT DOCUMENTS

| | | |
|---|---|---|
| DE | 102013015602 A1 | 3/2015 |
| EP | 3961005 A1 | 3/2022 |

* cited by examiner

Primary Examiner — Gonzalo Laguarda
(74) Attorney, Agent, or Firm — Davidson Kappel LLC (57) ABSTRACT

A cylinder head for an internal combustion engine with an exhaust aftertreatment arrangement includes a cylinder head base body, a valve cover connected to the cylinder head base body, and a carrier element for supporting the exhaust aftertreatment arrangement. The carrier element is supported against the cylinder head base body via a stud. The stud extends through the valve cover.

15 Claims, 8 Drawing Sheets

CYLINDER HEAD FOR AN INTERNAL COMBUSTION ENGINE WITH AN EXHAUST AFTERTREATMENT ARRANGEMENT AND AN INTERNAL COMBUSTION ENGINE WITH SUCH A CYLINDER HEAD

CROSS REFERENCE TO RELATED APPLICATION

The present disclosure claims the benefit of a German Patent Application DE102023001954.2, filed on May 13, 2023 which is hereby incorporated by reference herein.

TECHNICAL FIELD

The present disclosure relates to a cylinder head for an internal combustion engine with an exhaust aftertreatment arrangement and to an internal combustion engine with such a cylinder head.

BACKGROUND

Cylinder heads close off the combustion chamber of internal combustion engines on the side opposite the piston. Intake and exhaust ducts, oil ducts for lubricating mechanically moving parts and coolant ducts are integrated into cylinder heads. The cylinder head also carries the valves, the valve train and the injector and ignition devices.

Exhaust aftertreatment arrangements for internal combustion engines are used to reduce pollutants in the exhaust gases of the internal combustion engine. Known exhaust aftertreatment arrangements include soot particle filters or SCR catalytic converters, for example.

DE 10 2013 015 602 A1 discloses an internal combustion engine with an exhaust gas aftertreatment system, whereby the exhaust gas aftertreatment system is pivotably attached to both sides of the cylinder banks with fastening elements.

US 2010/0 186 394 A1 discloses a carrier arrangement for an exhaust gas aftertreatment unit, comprising a fastening element that can be integral with the valve cover or the crankcase.

A mounting bracket for an exhaust gas aftertreatment unit is known from EP 3 961 055 A1, comprising mounting feet that can be attached to the cylinder head.

US 2017/0 204 770 A1 discloses a carrier arrangement for an exhaust gas aftertreatment unit, comprising a fastening element that is attached to the cylinder head.

SUMMARY

The present disclosure provides a space-saving cylinder head with high stiffness, which is suitable for carrying an exhaust aftertreatment arrangement, and provides an internal combustion engine with such a space-saving cylinder head.

The task underlying the present disclosure is solved by a cylinder head for an internal combustion engine with an exhaust aftertreatment arrangement, comprising: a cylinder head base body, a valve cover which is connected to the cylinder head base body, and a carrier element for carrying the exhaust aftertreatment arrangement, the carrier element being supported against the cylinder head base body via a stud and the stud extending through the valve cover.

The proposed cylinder head has the advantage that the cylinder head has a compact structure for supporting an exhaust aftertreatment arrangement with high stiffness.

In one possible embodiment, the carrier element can be connected to the stud on a first side of the valve cover. The stud can also be connected to the cylinder head base body on a second side of the valve cover, which is opposite the first side. The first side can face away from the cylinder head base body and the second side can face the cylinder head base body.

In another possible embodiment, the valve cover can have a through-hole through which the stud extends. Alternatively or in combination, a sleeve can be inserted into the valve cover through which the stud extends. A free end of the sleeve can protrude from the valve cover on the first side of the valve cover.

The valve cover may be made of a first material, and the sleeve may be made of a second material. In particular, the second material can have a higher young's modulus than the first material. For example, the first material can be aluminum, an aluminum alloy or plastic. The second material can be steel, for example. This makes it possible to create a valve cover with a high load-bearing capacity and a low overall weight.

In one possible embodiment, the stud may have a first threaded portion. The first threaded portion can be screwed into an internal thread in the cylinder head base body. The stud can comprise a first spacing portion. The first spacing portion can adjoin the first threaded portion and can extend through the valve cover. The stud can include an abutment portion. The abutment portion can adjoin the first spacing portion.

In one possible embodiment, the stud, the valve cover and the cylinder head base body can be braced together, with the abutment portion being supported on the valve cover. In an alternative embodiment, the stud, the sleeve and the cylinder head base body can be braced together, with the abutment portion being supported on the sleeve, in particular on the free end of the sleeve.

In another possible embodiment, the stud may comprise a connecting portion to which the carrier element is connected. The connecting portion can adjoin the abutment portion on the side facing away from the cylinder head base body. The connecting portion may include a second spacing portion that extends through a through-hole of the carrier element. The second spacing portion can adjoin the abutment portion. The connecting portion may further comprise a second threaded portion adjoining the second spacing portion and engaging a nut such that the stud, the carrier element and the nut are braced together, the nut being supported on the carrier element and the carrier element being supported on the abutment portion of the stud.

In one possible embodiment, the carrier element can be supported on the cylinder head base body via several studs, with each of the several studs extending through the valve cover. The valve cover may describe a central longitudinal plane arranged parallel to a longitudinal axis of the plurality of studs, and a first partial number of the plurality of studs is arranged on a first side of the central longitudinal plane and a second partial number of the plurality of studs is arranged on a second side of the central longitudinal plane. In this case, the studs of the first partial number of the multiple studs and the studs of the second partial number of the multiple studs can be arranged alternately in a longitudinal direction of the valve cover.

The task underlying the present disclosure is also solved by an internal combustion engine comprising: a cylinder head in a previously described embodiment.

BRIEF SUMMARY OF THE DRAWINGS

In the following, an embodiment of an internal combustion engine with a cylinder head according to the present disclosure is described with reference to the figure drawings.

DETAILED DESCRIPTION

FIGS. 1 to 9, which are described together below, show an internal combustion engine 1 with a cylinder head 6 according to the present disclosure. The internal combustion engine 1 comprises a crankcase 2 in which a crankshaft 3 is mounted. The axis of rotation of the crankshaft 3 defines the longitudinal axis L_1 of the internal combustion engine 1. The crankcase 2 has a cylinder bore 4 which, together with a piston not shown, defines a variable-size combustion chamber in a known manner. At a vertically lower end, the crankcase 2 is connected to an oil pan 5. At an opposite vertical upper end, the crankcase 2 is connected to the cylinder head 6. The vertical direction refers to a target installation position of the internal combustion engine 1.

The cylinder head 6 comprises a cylinder head base body 7, which is connected to the crankcase 2. The cylinder head base body 7 has a flame deck 8, which closes off the cylinder bore 4 or combustion chamber at an end facing the cylinder head 6. The cylinder head base body 7 accommodates intake and exhaust ports, intake and exhaust valves and injection valves in a known manner.

The cylinder head 6 comprises a valve cover 10, which is connected to the cylinder head base body 7 on a side of the cylinder head base body 7 facing away from the crankcase 2. The cylinder head base body 7 and the valve cover 10 define a valve chamber 11 in which the valve control, for example a camshaft, is arranged.

A carrier element 29 is connected to the cylinder head 6. The carrier element 29 is designed to carry an exhaust aftertreatment arrangement 39, shown purely schematically in FIG. 3. In the present case, the exhaust aftertreatment arrangement 39 comprises two essentially cylindrical exhaust aftertreatment elements 40, 41, for example a soot particle filter and an SCR catalytic converter.

Figure 8:
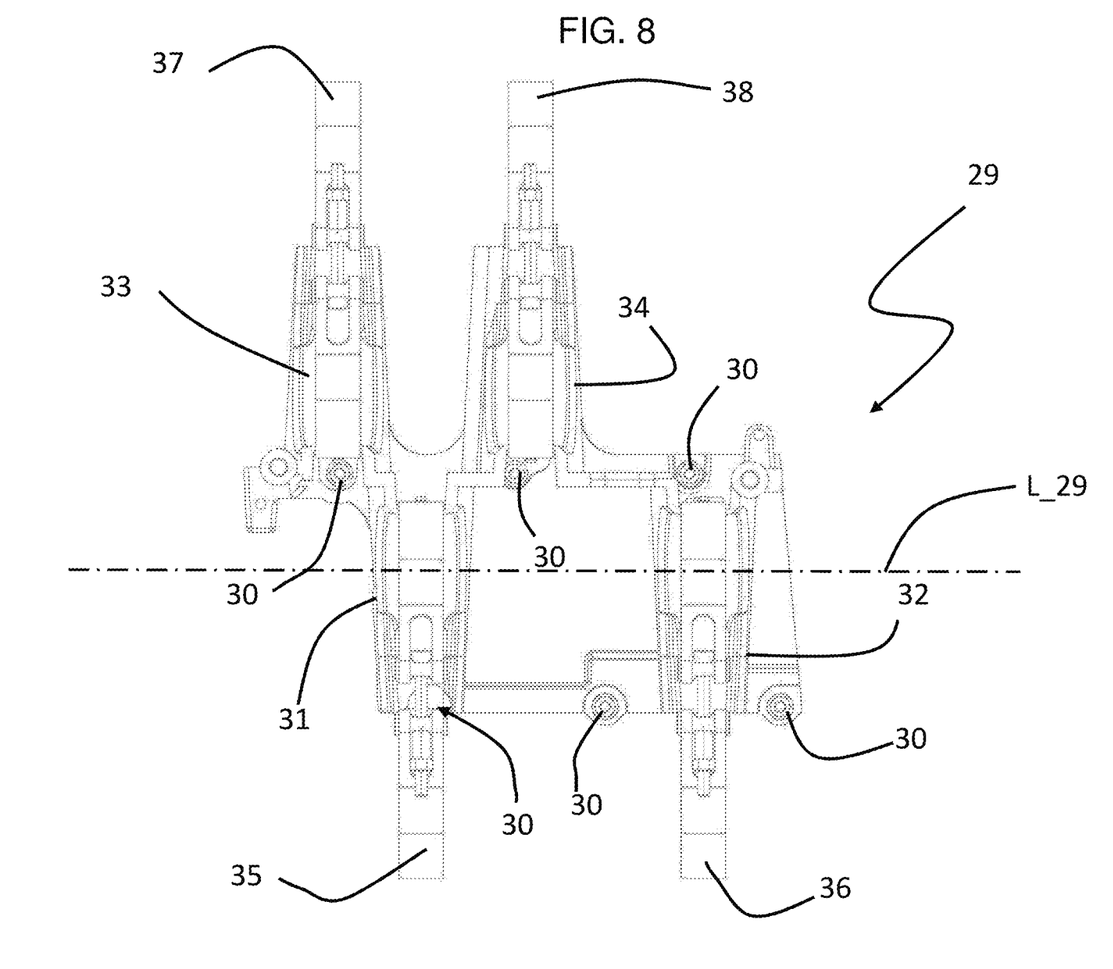
FIG. 8 is a top view of the carrier element of FIG. 1.
Figure 9:
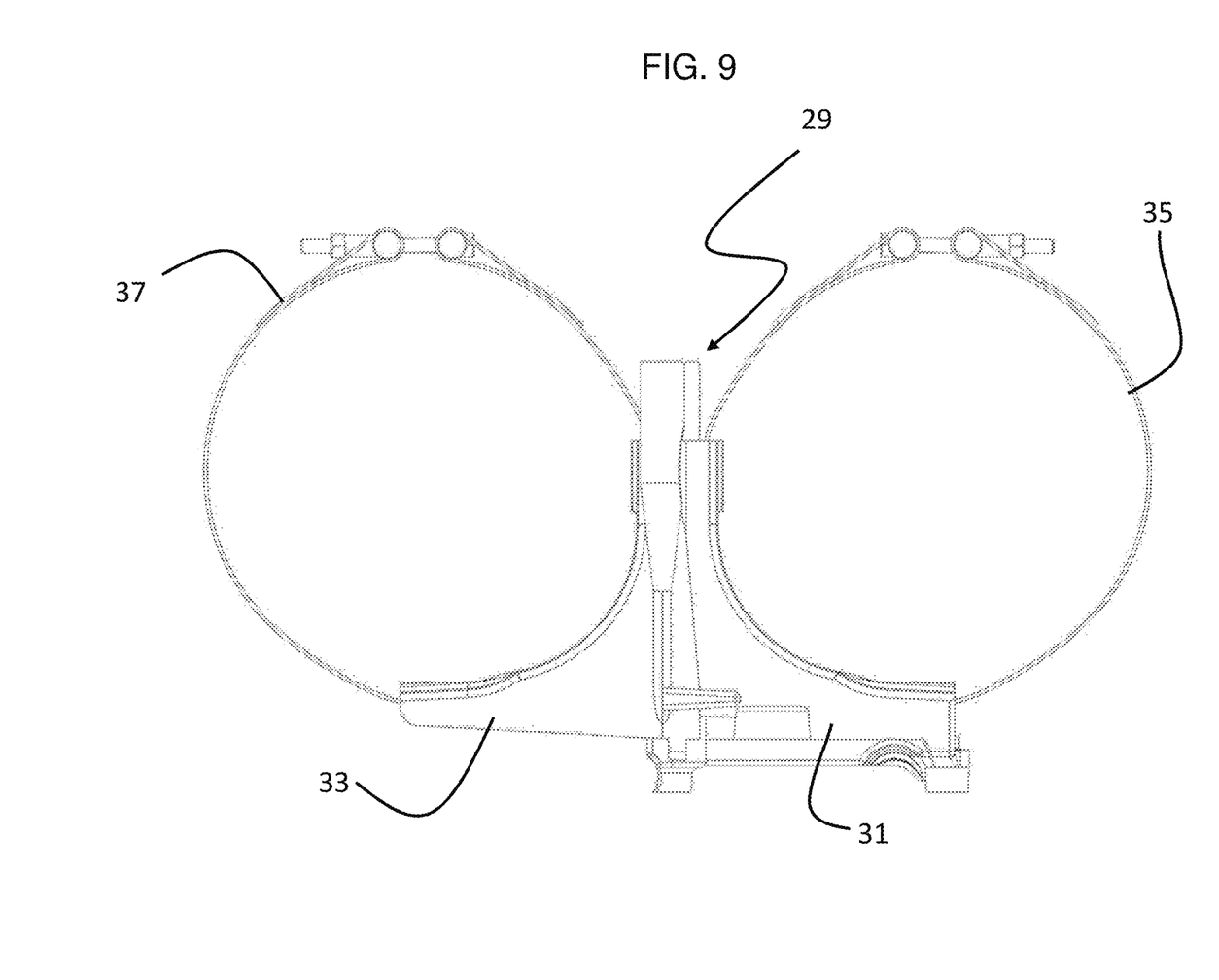
FIG. 9 is a front view of the carrier element from FIG. 8.

The carrier element 29 has a first receiving section 31, a second receiving section 32, a third receiving section 33 and a fourth receiving section 34. A tensioning strap 35, 36, 37, 38 is attached to each of the four receiving sections 31, 32, 33, 34. The first exhaust gas aftertreatment element 40 is braced between the first receiving section 31 and the first tensioning strap 35 and between the second receiving section 32 and the second tensioning strap 36. The second exhaust gas aftertreatment element 41 is braced between the third receiving section 33 and the third tensioning strap 37 and between the fourth receiving section 34 and the fourth tensioning strap 38.

A first partial number of the four receiving sections 31, 32, 33, 34 is oriented in a first direction with respect to a longitudinal axis L_29 of the carrier element 29. A second partial number of the four receiving sections 31, 32, 33, 34 is oriented in a second direction opposite to the first direction with respect to the longitudinal axis L_29 of the carrier element 29. In the present case, the first receiving section 31 and the second receiving section 32 are oriented towards an exhaust side and the third receiving section 33 and the fourth receiving section 34 are oriented towards an intake side of the cylinder head 6. In the direction of the longitudinal axis L_29 of the carrier element 29, the receiving sections 31, 32 of the first partial number and the receiving sections 33, 34 of the second partial number are arranged alternately.

Figure 6:
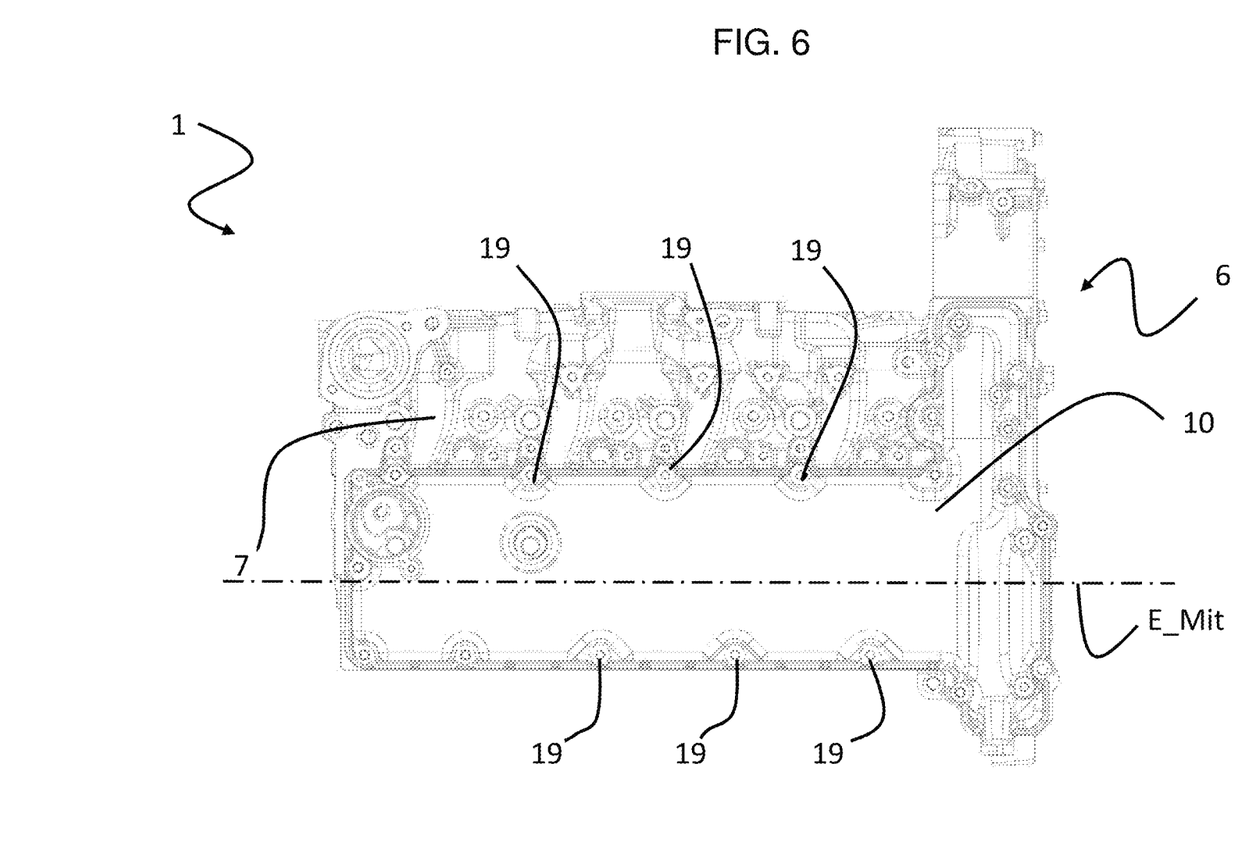
FIG. 6 is a top view of the internal combustion engine from FIG. 1 without the carrier element.
Figure 7:
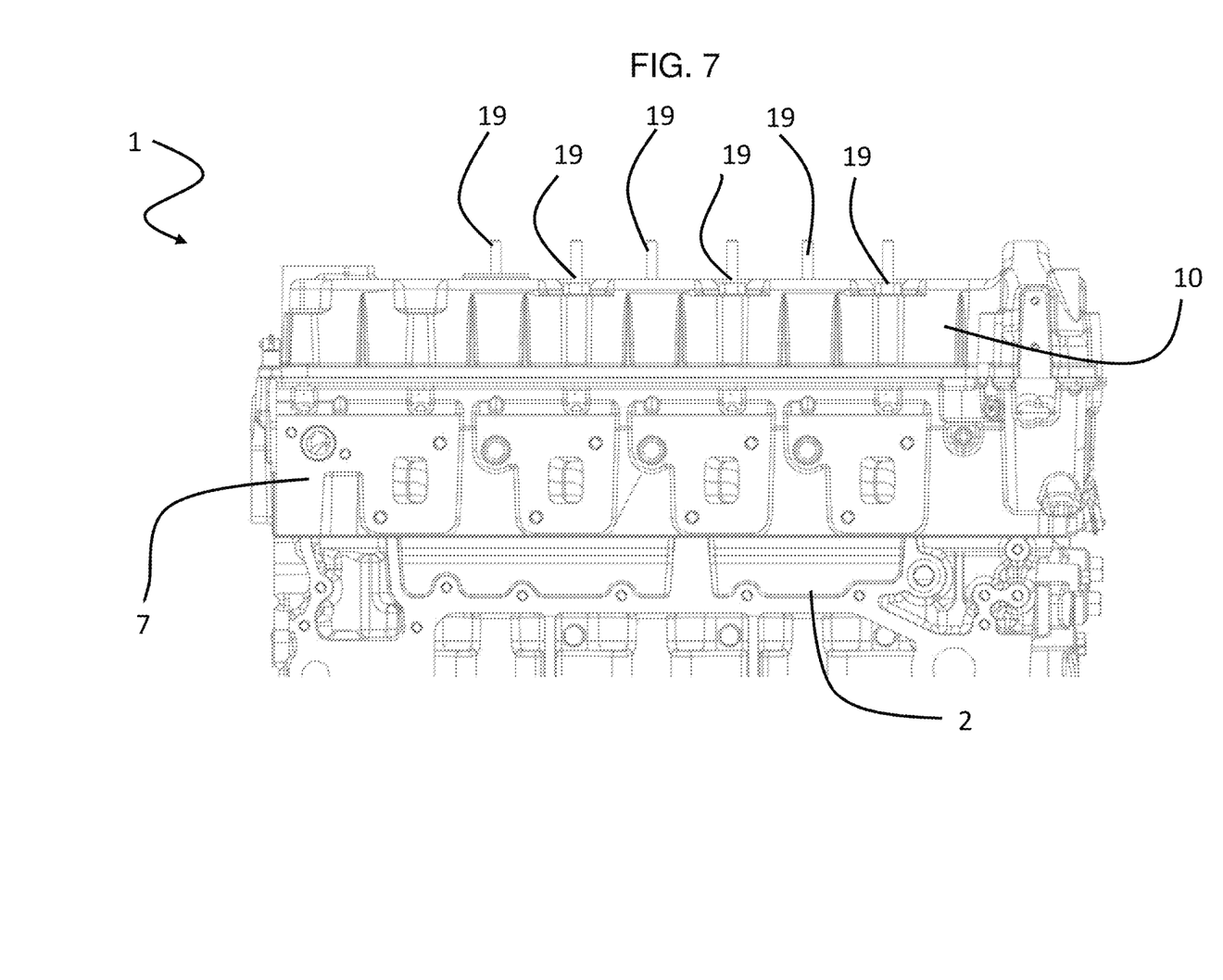
FIG. 7 is a side view of the upper part of the internal combustion engine from FIG. 1 without the carrier element.

The internal combustion engine 1 comprises six studs 19 via which the carrier element 29 is supported against and connected to the cylinder head 6. The carrier element 29 comprises six through-holes 30 through which the studs 19 extend. The valve cover 10 describes a central longitudinal plane E_Mit, which is arranged in each case parallel to a longitudinal axis L_19 of the plurality of studs 19, wherein a first partial number of the plurality of studs 19 is arranged on a first side of the central longitudinal plane E_Mit and a second partial number of the plurality of studs 19 is arranged on a second side of the central longitudinal plane E_Mit. The central longitudinal plane E_Mit is arranged parallel to the longitudinal axis L_1 of the internal combustion engine. In the present case, the first partial number of the plurality of studs 19 and the second partial number of the plurality of studs 19 are each three. The studs of the first partial number of the plurality of studs 19 and the studs of the second partial number of the plurality of studs 19 are arranged at a distance from one another transversely to the central longitudinal plane E_Mit.

Figure 1:
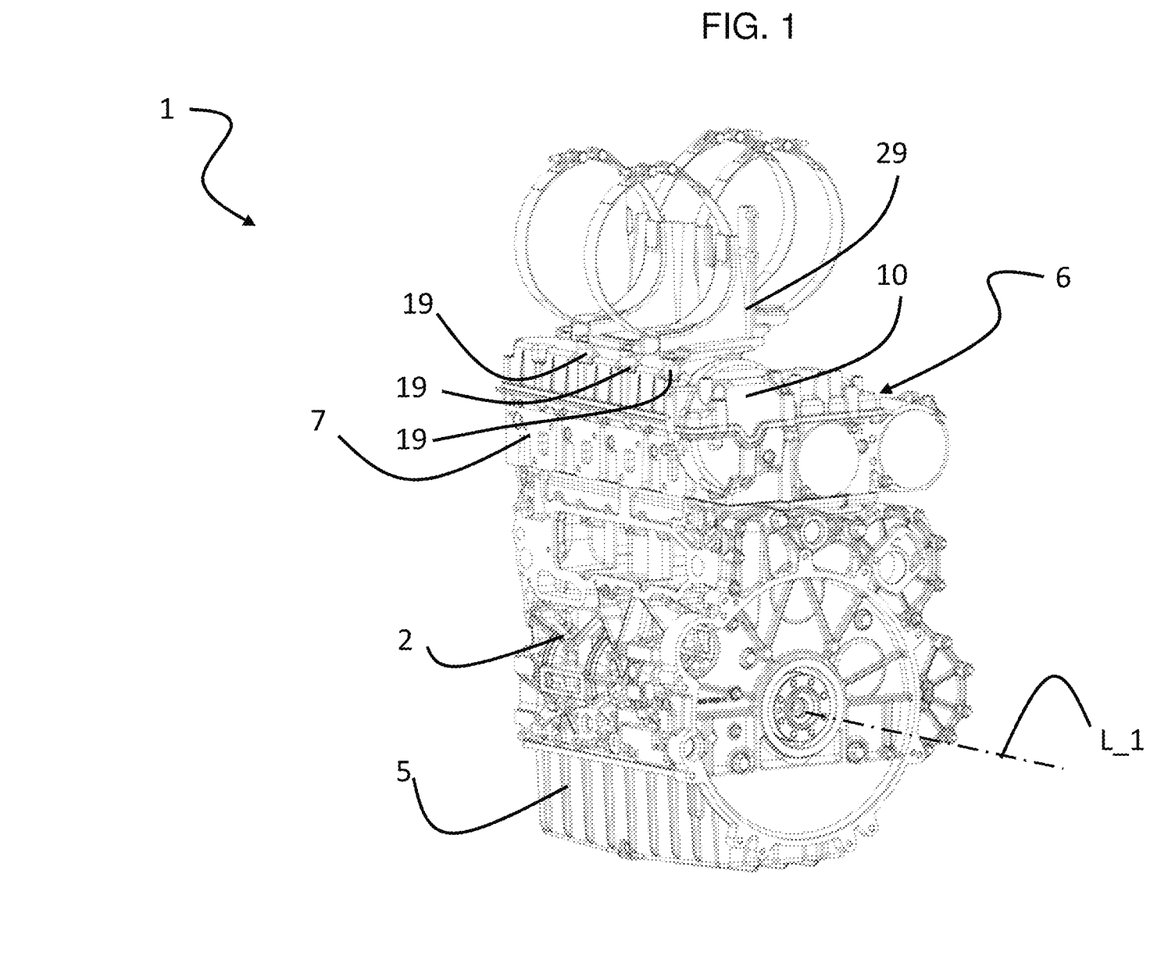
FIG. 1 is a perspective view of an internal combustion engine from the rear left.
Figure 2:
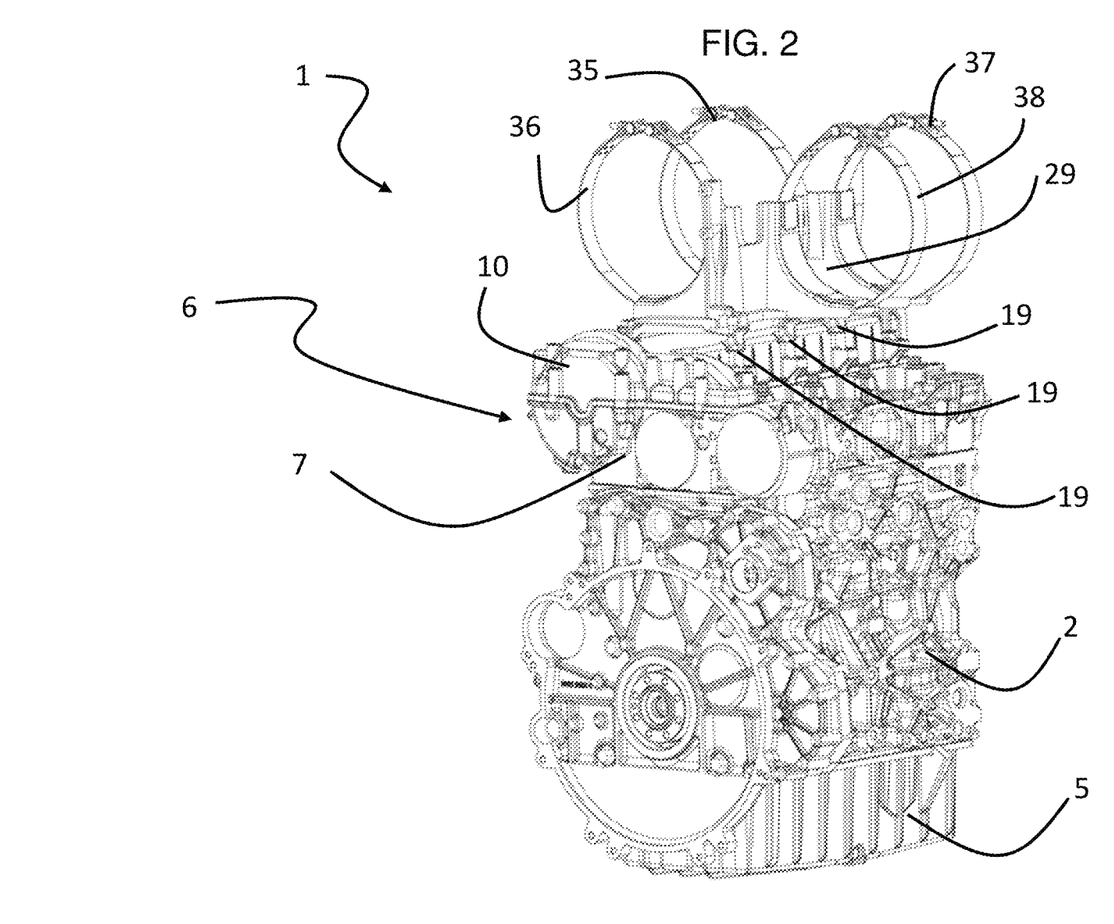
FIG. 2 is a perspective view of an internal combustion engine from FIG. 1 from the rear right.
Figure 3:
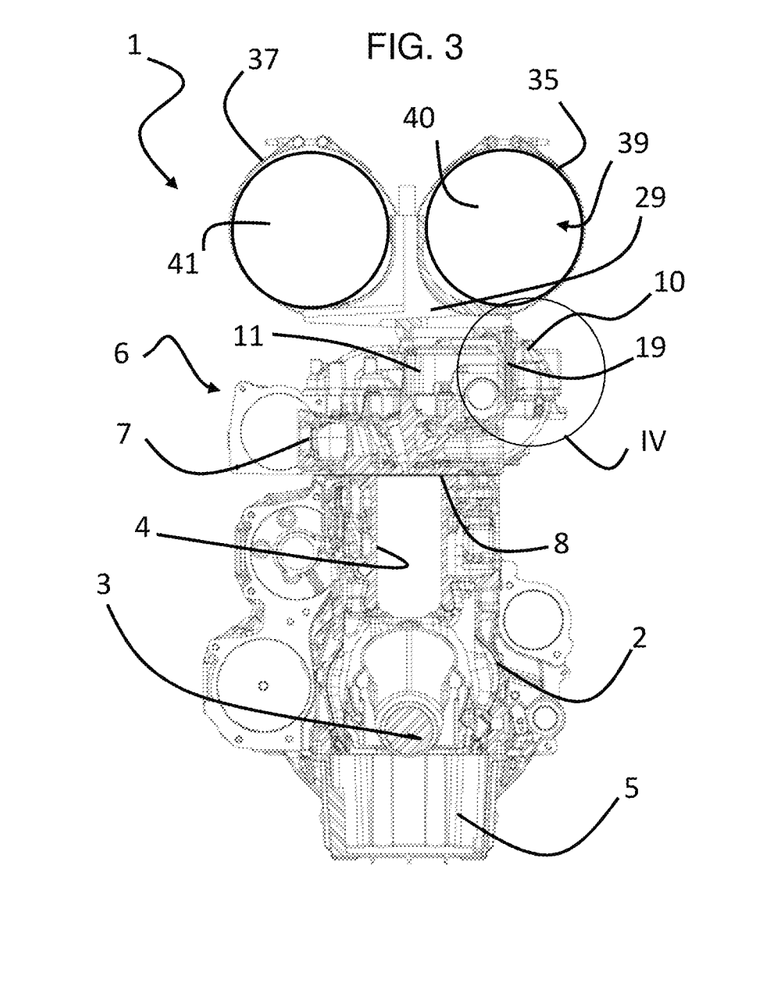
FIG. 3 is a cross-section of the internal combustion engine from FIG. 1 through the longitudinal axis of a stud
Figure 4:
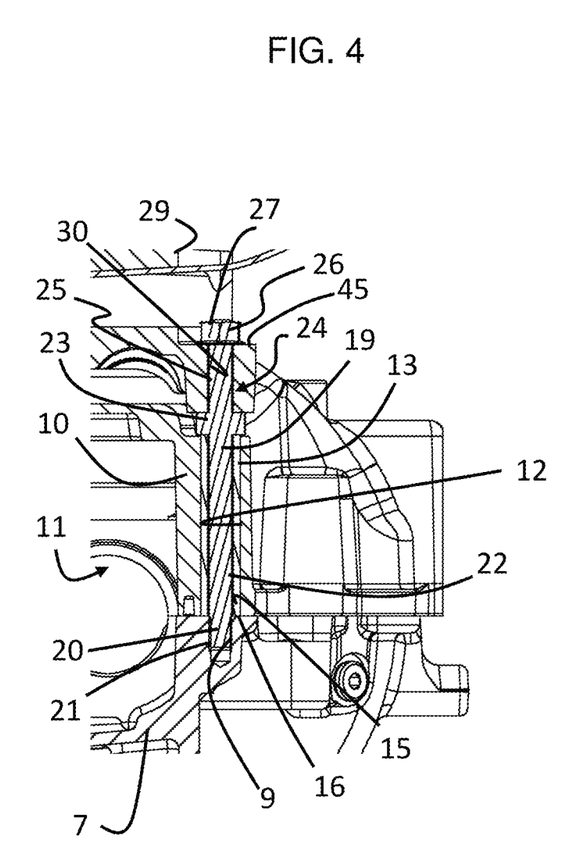
FIG. 4 is an enlarged view of detail IV from FIG. 3.

The several studs 19 are identical in the present case, so that their structure and arrangement are explained below using one stud as an example. The stud 19 extends through a through-hole 12 of the valve cover 10. The stud 19 comprises a first threaded portion 20, which is designed with an external thread 21 that engages in an internal thread 9 of the cylinder head base body 7. The stud 19 is thus firmly connected to the cylinder head base body 7. Stud 19 can therefore also be referred to as a bolt. The stud 19 also comprises a first spacing portion 22, which is arranged at least in sections within the through-hole 12. In other words, the stud 19 extends through the valve cover 10 with the first spacing portion 22. The first spacing portion 22 adjoins the first threaded portion 20.

Figure 5:
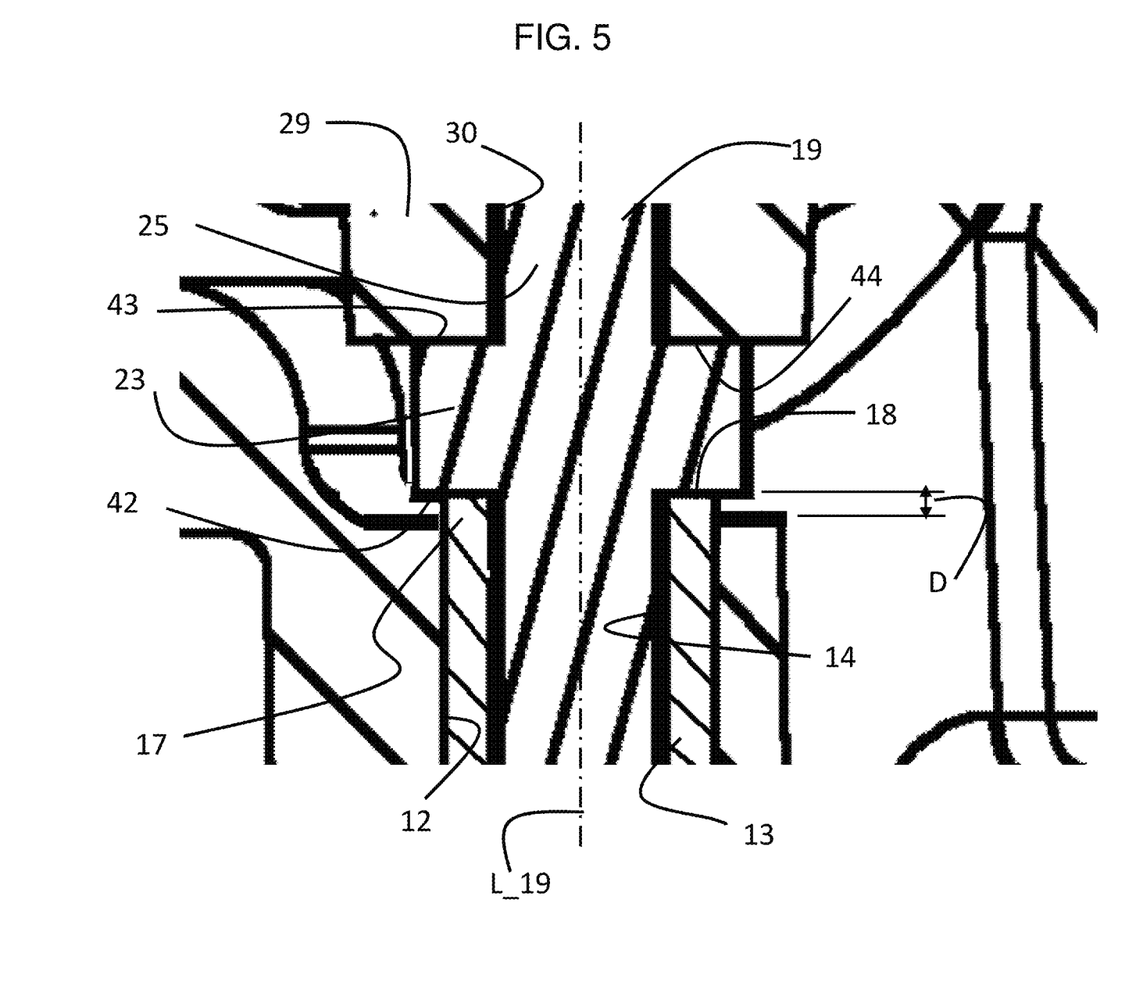
FIG. 5 is an enlarged section of the detailed view from FIG. 4 in the area of the abutment portion 23.

The stud 19 also comprises an abutment portion 23, which adjoins the spacing portion 22. The abutment portion 23 is designed as a prismatic shoulder of the stud 19 and has a first abutment surface 42 and a second abutment surface 43. The first abutment surface 42 is oriented in the direction of the cylinder head base body 7 and the second abutment surface 43 is oriented in the direction of the carrier element 29. The first abutment surface 42 is in contact with the sleeve 13. The abutment portion 23, the sleeve 13 and the cylinder head base body 7 are braced together. The bracing or clamping force can be adjusted via the screw-in force of the external thread 21 of the stud 19 in the internal thread 9 of the cylinder head base body 7. The second abutment surface 43 is in contact with a first bearing surface 44 of the carrier element 29. In other words, the carrier element 29 rests with the first bearing surface 44 on the second bearing surface 43.

The abutment portion 23 may be configured as a tool engaging portion configured to allow a tool to engage the abutment portion 23 to screw the stud 19 into the cylinder head base body 7. The abutment portion 23 can therefore be designed as an external polygon section, for example.

In addition, the stud 19 comprises a connecting portion 24, which is designed such that the carrier element 29 can be connected to the stud 19 via the connecting portion 24. In the present case, the connecting portion 24 comprises a second spacing portion 25, which adjoins the abutment portion 23, and an adjoining second threaded portion 26. The second spacing portion 25 extends through the through-hole 30 of the carrier element 29. The second threaded portion 26 is arranged at least in sections on a side of the carrier element 29 facing away from the valve cover 10 outside the carrier element 29 and thus forms a free end of the connecting portion 24. A nut 27 can be screwed onto the second threaded portion 26 so that the nut 27 is in contact with a second contact surface 45 of the carrier element 29, which is located on a side of the carrier element 29 facing away from the valve cover 10. The nut 27, the carrier element 29 and the stud 19, in particular the abutment portion 23 of the stud 19, are braced or clamped together. The clamping or bracing force can be adjusted via the screwing force of the nut 27 on the connecting portion 24.

A sleeve 13 is inserted into the through-hole 12 of the valve cover 10, in particular cast or pressed in, which has a through-opening 14 through which the stud 19 with the first spacing portion 22 extends. The sleeve 13 has a first end 15 with a contact surface 16 and a second end 17 with a contact surface 18. The first end 15 is oriented in the direction of the cylinder head base body 7, so that the contact surface 16 is in contact with the cylinder head base body 7. The second end 17 is oriented away from the cylinder head base body 7, with the contact surface 18 in contact with the stud 19, in particular with the first abutment surface 42 of the abutment portion 23. The second end 17 of the sleeve 13 protrudes from the valve cover 10 by the amount D. The second end 17 of the sleeve 13 can therefore also be referred to as the free end.

LIST OF REFERENCE SIGNS

1 Internal combustion engine
2 Crankcase
3 Crankshaft
4 Cylinder bore
5 Oil pan
6 Cylinder head
7 Cylinder head base body
8 Flame deck
9 Internal thread
10 Valve cover
11 Valve chamber
12 Through-hole
13 Sleeve
14 Through-opening
15 First end
16 Contact surface
17 Second end
18 Contact surface
19 Stud
20 Threaded portion
21 External thread
22 Spacing portion
23 Abutment portion
24 Connecting section
25 Spacing portion
26 Threaded portion
27 Nut
29 Carrier element
30 Through-hole
31 Receiving section
32 Receiving section
33 Receiving section
34 Receiving section
35 Tensioning strap
36 Tensioning strap
37 Tensioning strap
38 Tensioning strap
39 Exhaust aftertreatment arrangement
40 Exhaust gas aftertreatment element
41 Exhaust gas aftertreatment element
42 Abutment surface
43 Abutment surface
44 Contact surface
45 Contact surface
D Amount
E plane
L Longitudinal axis

What is claimed is:

1. A cylinder head for an internal combustion engine with an exhaust aftertreatment arrangement, comprising:
 a cylinder head base body;
 a valve cover connected to the cylinder head base body; and
 a carrier element for supporting the exhaust aftertreatment arrangement,
  wherein the carrier element is supported against the cylinder head base body via a stud,
  wherein the stud extends through the valve cover.

2. The cylinder head according to claim 1, wherein the carrier element is connected to the stud on a first side of the valve cover and the stud is connected to the cylinder head base body on a second side of the valve cover opposite of the first side.

3. The cylinder head according to claim 1, wherein the valve cover has a through-hole through which the stud extends.

4. The cylinder head according to claim 1, wherein a sleeve is inserted into the valve cover, through which the stud extends.

5. The cylinder head according to claim 4, wherein the carrier element is connected to the stud on a first side of the valve cover and the stud is connected to the cylinder head base body on a second side of the valve cover opposite of the first side,
 wherein a free end of the sleeve projects out of the valve cover on the first side of the valve cover.

6. The cylinder head according to claim 4, wherein the valve cover is made of a first material, and the sleeve is made of a second material, wherein the second material has a higher young's modulus than the first material.

7. The cylinder head according to claim 1, wherein the stud has a first threaded portion which is screwed into an internal thread in the cylinder head base body, and a first spacing portion which adjoins the first threaded portion and extends through the valve cover, and an abutment portion adjoining the first spacing portion.

8. The cylinder head according to claim 7, wherein the stud, the valve cover and the cylinder head base body are braced together, the abutment portion being supported on the valve cover.

9. The cylinder head according to claim 7, wherein a sleeve is inserted into the valve cover, through which the stud extends,
 wherein the stud, the sleeve and the cylinder head base body are braced together, the abutment portion being supported on a free end of the sleeve.

10. The cylinder head according to claim 7, wherein the stud comprises a connecting portion which adjoins the abutment portion and to which the carrier element is connected.

11. The cylinder head according to claim 10, wherein the connecting portion comprises a second spacing portion which adjoins the abutment portion and extends through a through-hole of the carrier element, and a second threaded portion which adjoins the second spacing portion and is thus engaged with a nut, and the stud, the carrier element and the nut are braced together, the nut being supported on the carrier element and the carrier element being supported on the abutment portion of the stud.

12. The cylinder head according to claim 1, wherein the stud is a plurality of studs and the carrier element is supported on the cylinder head base body via the plurality of studs, the plurality of studs each extending through the valve cover.

13. The cylinder head according to claim 12, wherein the valve cover describes a central longitudinal plane which is arranged parallel to a longitudinal axis of the plurality of studs, and a first partial number of the plurality of studs is arranged on a first side of the central longitudinal plane and a second partial number of the plurality of studs is arranged on a second side of the central longitudinal plane.

14. The cylinder head according to claim 13, wherein studs of the first partial number of the plurality of studs and studs of the second partial number of the plurality of studs are arranged alternately in a longitudinal direction of the valve cover.

15. An internal combustion engine including the cylinder head according to claim 1.

* * * * *